United States Patent Office 3,808,309
Patented Apr. 30, 1974

3,808,309
PURIFICATION OF SILICA BY PREFERENTIAL EXTRACTION
Valdis R. Daiga and Marco Cristanetti, Toledo, Ohio, assignors to Owens-Illinois, Inc.
No Drawing. Filed Sept. 15, 1971, Ser. No. 180,847
Int. Cl. C01b 33/12, 33/16, 33/18
U.S. Cl. 423—335                        5 Claims

ABSTRACT OF THE DISCLOSURE

Silica of high purity and defined particle shape is prepared by dissolving amorphous silica in an aqueous alkaline solution, adding an acid to form silicic acid, extracting the silicic acid with an organic hydrogen bonding agent and polymerzing the silicic acid in the presence of a fluoride catalyst. In this manner, metallic oxide impurities remain in the aqueous phase so that by filtering and washing the silica particles with water both the metallic oxide impurities and alkali metal salts are removed. The resulting product is spherical, porous, substantially devoid of contaminants and of controlled particle size.

BACKGROUND OF THE INVENTION

There are several known methods for preparing silica beads from water soluble silicates. These methods usually involve the preparation of a suspension of acidified, aqueous sodium silicate in a water-immiscible medium such as a liquid hydrocarbon. The resulting suspension is maintained until the spheres have hardened after which they are separated and washed to remove any contaminants.

More specifically, improvements in prior processes of forming solid, spherical beads from alkali metal silicates such as sodium silicate are disclosed in U.S. Pats. 3,258,311 and 3,489,516, the contents of which are incorporated by reference in the present application to illustrate the state of the art. The main objection to silica particles such as silica beads prepared by all of the known processes is that the silica still contains several impurities including oxides of iron, aluminum, titanium, sodium, potassium and lithium which is undesirable for commercial use. The soluble sodium silicates have been used in detergents, adhesives, cements, sizes, coatings, water treatment, roofing granules and oil-well drilling compositions. In addition, a need for removing contaminants from silica particles has developed since silica in the form of beads has found application in chromatography, low impurity silica composition glass and as a catalyst for hydrocarbon conversion in the petroleum industry.

SUMMARY OF THE INVENTION

This invention is based upon the discovery that impure silica particles produced by the prior art methods previously set forth can be dissolved in an aqueous alkaline solution and the impurities removed therefrom by a preferential extraction process. Tne process involves contacting the aqueous alkaline silica solution with an acid such as sulfuric acid so that silicic acid is formed. The silicic acid is then extracted wth an organic hydrogen bonding agent such as isopropyl alcohol in which medium the silicic acid is polymerized in the presence of a fluoride catalyst to produce silica particles of high purity. The metallic oxide impurities generally present in silica gels or amorphnous silica remain in the aqueous phase. The solid silica particles are finally separated and washed with distilled water to remove all traces of any alkali adhering to the surfaces thereof.

DESCRIPTION OF THE PREFERRED EMBODIMENTS

Example 1

The silica source in this example was silica beads prepared as described in Example 1 of U.S. Pat. 3,489,516. Two hundred grams of silica beads were dissolved in a caustic solution containing 200 grams of sodium hydroxide per 1500 ml. of water. A second solution was prepared containing 910 ml. of 12% aqueous sulfuric acid, 3.9 grams of sodium silicofluoride and 450 ml. of isopropyl alcohol. To said second solution was added rapidly with stirring 990 ml. of the silica caustic solution followed by the addition of 510 grams of sodium chloride which immediately formed two phases, one of which was principally aqueous (the continuous phase), and the other principally isopropyl alcohol (the dispersed phase). Stirring was continued for 3 hours during which time silica beads began to form and polymerization of the silica was completed within the dispersed phase. The silica particles were then removed by filtration, washed with water, dried and analyzed for impurities in an emission spectrograph. The table below shows the reduction in impurities expressed in parts per million obtained by the preferential extraction process employed.

| Impurity | Before reaction | After reaction |
| --- | --- | --- |
| $Fe_2O_3$ | 50 | 5 |
| $MgO$ | 3 | 3 |
| $Cr_2O_3$ | 1 | 1 |
| $SnO_2$ | 4 | 1 |
| $NiO$ | 3 | 3 |
| $Al_2O_3$ | 9 | 5 |
| $TiO_2$ | 32 | 2 |
| $CaO$ | 7 | |
| $MoO_3$ | 1 | |

Example 2

The procedure and reactants were the same as those set forth in Example 1 except that a Silica Gel Grade 12 commercially available from the W. R. Grace Co., 101 N Charles St., Baltimore, Md., was used as the source of silica. After 2½ hours of reaction time, the product was separated from the reaction media by filtration, washed and dried. The results of the preferential extraction purification are shown in the following table in which the impurities present in the silica particles before and after reaction are expressed in parts per million.

| Impurity | Before reaction | After reaction |
| --- | --- | --- |
| $Fe_2O_3$ | >50 | 13 |
| $MgO$ | 14 | 3 |
| $Cr_2O_3$ | 0.5 | 0.5 |
| $NiO$ | 0.7 | 0.5 |
| $MnO$ | 0.4 | 0.4 |
| $Al_2O_3$ | 32 | 12 |
| $CaO$ | >60 | 6 |
| $MoO_3$ | 0.4 | 0.4 |
| $PbO$ | 4 | 0.4 |
| $ZrO_2$ | 32 | 0.4 |
| $TiO_2$ | >117 | 8 |
| $SnO_2$ | 1 | 1 |

It is apparent from the foregoing examples that the process herein disclosed greatly reduces the impurities present in silica prepared by any known process. In particular, we have discovered that even silica particles prepared by the method disclosed in U.S. Pat. 3,489,516 can be readily purified by the preferential extraction process of the present invention.

Although sulfuric acid is preferred for inclusion in the reaction system, other acids such as hydrochloric, nitric, phosphoric, acetic, oxalic and the like may be used if desired. Likewise, in place of isopropyl alcohol as the preferred hydrogen bonding agent one may use n-butanol, diethylene glycol di-n-butyl ether, isophorone, ethylene glycol mono-n-hexyl ether or 2-ethyl-1, 2-hexandiol. Similarly, salting agents other than sodium chloride can be used such as sodium sulfate, potassium chloride, sodium acetate, ammonium sulfate and lithium nitrate. In lieu of sodium silicofluoride as the polymerization catalyst, such compounds as ammonium fluoride or the fluorides of potassium, tin, copper, silver and zinc can be substituted with equally effective results. Also, in the case of some hydrogen bonding agents, increased temperature can be substituted for the use of silica polymerization catalyst. Any amorphous silica can be employed as a starting material and dissolved in an alkaline aqueous solution such as potassium hydroxide or barium hydroxide but sodium hydroxide is preferred.

We claim:
1. A method of purifying silica containing metallic oxide impurities predominantly $Fe_2O_3$, $TiO_2$, CaO, MgO, $Al_2O_3$ and $ZrO_2$ which comprises reacting amorphous silica particles with alkali in an aqueous medium, reacting the resulting solution with an acid to form silicic acid, extracting the silicic acid formed with an organic compound selected from the group consisting of isopropyl alcohol and n-butanol which has been phase separated by the addition of a salting out agent, polymerizing the silicic acid in the organic extractant in the presence of a catalytic amount of a fluoride ion and separating the solid silica particles thus formed.

2. A method as in claim 1 in which the alkali employed is an alkali metal hydroxide.

3. A method as in claim 1 in which the acid employed is an inorganic acid.

4. A method as in claim 1 in which the polymerization of the silicic acid is carried out in the presence of an inorganic fluoride.

5. A method of purifying silica as in claim 1 which comprises reacting amorphous silica particles containing metallic oxide impurities predominantly $Fe_2O_3$, $TiO_2$, CaO, MgO, $Al_2O_3$ and $ZrO_2$ with sodium hydroxide in an aqueous medium, reacting the resulting solution with sulfuric acid to form silicic acid, extracting the silicic acid thus formed with isopropyl alcohol which has been phase separated by the addition of sodium chloride, polymerizing the silicic acid in the isopropyl alcohol in the presence of sodium silicofluoride as a catalyst, separating the solid silica particles formed by filtration and washing said particles with water.

References Cited

UNITED STATES PATENTS

| 2,556,005 | 6/1951 | Segrove | 23—182 P |
|---|---|---|---|
| 2,921,839 | 1/1960 | Ritter | 23—182 P |
| 3,258,311 | 6/1966 | Burzynski et al. | 23—182 R |
| 3,489,516 | 1/1970 | Kummerle | 23—182 R |
| 3,656,901 | 4/1972 | Kummerle | 23—182 R |
| 1,973,211 | 9/1934 | Kirkham | 423—339 |

OTHER REFERENCES

Ralph K. Iler book, "The Colloid Chemistry of Silica and Silicates," 1955 ed., pp. 38, 45, 46 and 49, Cornell Univ. Press, Ithaca, N.Y.

"The Colloid Chemistry of Silica and Silicates" by Ralph K. Iler, 1955 ed., pp. 11–14 and 20, Cornell Univ. Press, Ithaca, N.Y.

EDWARD STERN, Primary Examiner

U.S. Cl. X.R.

423—338, 334, 340